United States Patent
Khan et al.

(10) Patent No.: US 7,395,273 B2
(45) Date of Patent: Jul. 1, 2008

(54) SYSTEM PROVIDING RECEIPT INSPECTION REPORTING

(75) Inventors: Javed M. Khan, San Jose, CA (US); Ching Hua Chien, San Jose, CA (US); Robert Walter Droege, San Jose, CA (US); Allen E. Dubberley, Los Gatos, CA (US); Richard Arthur Wolters, Jr., San Jose, CA (US)

(73) Assignee: General Electric Company, Schenectady, NY (US)

( * ) Notice: Subject to any disclaimer, the term of this patent is extended or adjusted under 35 U.S.C. 154(b) by 393 days.

(21) Appl. No.: 10/065,570

(22) Filed: Oct. 31, 2002

(65) Prior Publication Data

US 2004/0088324 A1    May 6, 2004

(51) Int. Cl.
*G06F 17/30* (2006.01)

(52) U.S. Cl. ............... 707/103 R; 707/101; 707/102; 707/104.1

(58) Field of Classification Search ............... 707/1, 707/3, 10, 100, 101, 102, 104.1, 507, 2, 4, 707/5, 9, 103 R; 705/8, 37, 400, 404; 382/141, 382/144, 149; 702/34; 704/260; 356/430; 701/29; 717/126; 716/4
See application file for complete search history.

(56) References Cited

U.S. PATENT DOCUMENTS

| | | | | |
|---|---|---|---|---|
| 5,423,033 | A * | 6/1995 | Yuen | 707/4 |
| 5,664,182 | A * | 9/1997 | Nierenberg et al. | 707/102 |
| 5,737,609 | A * | 4/1998 | Reed et al. | 717/126 |
| 6,070,155 | A * | 5/2000 | Cherrington et al. | 705/400 |
| 6,260,042 | B1 * | 7/2001 | Curbera et al. | 707/101 |
| 6,324,298 | B1 * | 11/2001 | O'Dell et al. | 382/149 |
| 6,405,207 | B1 * | 6/2002 | Petculescu et al. | 707/102 |
| 6,408,292 | B1 * | 6/2002 | Bakalash et al. | 707/2 |
| 6,539,106 | B1 * | 3/2003 | Gallarda et al. | 382/149 |
| 6,859,805 | B1 * | 2/2005 | Rogers et al. | 707/9 |
| 2001/0030749 | A1 * | 10/2001 | Ho et al. | 356/430 |
| 2001/0047283 | A1 * | 11/2001 | Melick et al. | 705/8 |
| 2002/0013761 | A1 * | 1/2002 | Bundy et al. | 705/37 |
| 2002/0023086 | A1 * | 2/2002 | Ponzio, Jr. | 707/5 |
| 2002/0023251 | A1 * | 2/2002 | Nasr et al. | 716/4 |
| 2002/0035451 | A1 | 3/2002 | Rothermel | |
| 2002/0082982 | A1 * | 6/2002 | Mock et al. | 705/37 |

(Continued)

FOREIGN PATENT DOCUMENTS

DE    19844362    3/2000

OTHER PUBLICATIONS

French Office Action dated Oct. 26, 2004.

*Primary Examiner*—Thuy Pardo
(74) *Attorney, Agent, or Firm*—Harness, Dickey & Pierce, P.L.C.

(57) ABSTRACT

A system for providing receipt inspection reporting (RIR) allows for entry, modification, searching and reporting of RIR data. The RIR data is stored in a database and accessible online to facilitate tracking and analysis of defects and other problems. Searches and custom reports also may be generated to provide RIR tracking and analysis of problems. Logging and tracking of defects allows for root cause analysis using RIR data stored in a database to improve the RIR resolution process.

20 Claims, 7 Drawing Sheets

U.S. PATENT DOCUMENTS

| | | |
|---|---|---|
| 2002/0107873 A1* | 8/2002 | Winkler et al. ........... 707/104.1 |
| 2002/0111823 A1 | 8/2002 | Heptner |
| 2002/0138269 A1* | 9/2002 | Philley ..................... 704/260 |
| 2002/0184262 A1* | 12/2002 | Wakabayashi .............. 707/507 |
| 2002/0188593 A1* | 12/2002 | Moser et al. .................... 707/1 |
| 2003/0152260 A1* | 8/2003 | Cai ............................ 382/141 |
| 2003/0167240 A1* | 9/2003 | Napier et al. ............... 705/404 |
| 2003/0174876 A1* | 9/2003 | Eran et al. ................... 382/144 |
| 2004/0117131 A1* | 6/2004 | Peters et al. ................... 702/34 |
| 2005/0131596 A1* | 6/2005 | Cherrington et al. .......... 701/29 |

* cited by examiner

FIG. 4

Receiving Inspection Report
5/21/02
Welcome Sonny Sablan

Entry     Search/Reports     Report Error

Shipment Details

| | | |
|---|---|---|
| GE Control No LUN1-1163 | Package No 62.1631.2 | RE Jameson, Jr William G |
| Description Fuel Preparation Machine and Fuel Inspection Stand PS-1 | | CM Klaft, Karl |
| Resp Comp GE-SJ | POE Oakland, CA, USA | Lead Deaver, Gerald A |
| Supplier March MetalFab | FOB 3/2/02 | QE Francis, Gaby F |
| Ship Type | Packer | ← Update |

130 — 132 — 134

RIR Log Details

RIR Date 5/10/02     RIR No NSS-01-0061
Surveyor 136
142 — [Edit Log Details]            [Close RIR Log]

RIR Defects

1A7 - Mechanical - Short ship ← 146
    1A8 - Mechanical - Humidity
138     2A1 - O&M - Missing document
144 — [Edit Defects]

RIR Correspondence

| | Letter Date | Letter No | Action | Comment |
|---|---|---|---|---|
| 140 — [Add] | | | | |
| 148 — 1 | 5/8/02 | LCO-GE-MFAX-0157 | Bill Jameson's action by 5/22/02 | |

162 — RIR Log Details
- RIR Date: 5/16/02
- RIR No:
- Surveyor:
- "Create New Log" Button is below

164 — RIR Defects — 166

- ☐ 1A0 - Mechanical - Design/Fabrication error
- ☐ 1A1 - Mechanical - Packaging damage
- ☐ 1A2 - Mechanical - Minor physical damage
- ☐ 1A3 - Mechanical - Major physical damage
- ☐ 1A4 - Mechanical - Water damage
- ☐ 1A5 - Mechanical - Fall testing
- ☐ 1A6 - Mechanical - Corrosion
- ☐ 1A7 - Mechanical - Short ship
- ☐ 1A8 - Mechanical - Humidity
- ☐ 1A9 - Mechanical - Others (add comments)
- ☐ 1A10 - Mechanical - Scope Clarification
- ☐ 1B0 - Electrical - Design/Fabrication error
- ☐ 1B1 - Electrical - Packaging damage
- ☐ 1B2 - Electrical - Minor physical damage
- ☐ 1B3 - Electrical - Major physical damage
- ☐ 1B4 - Electrical - Water damage
- ☐ 1B5 - Electrical - Fall testing
- ☐ 1B6 - Electrical - Corrosion
- ☐ 1B7 - Electrical - Short ship
- ☐ 1B8 - Electrical - Humidity
- ☐ 1B9 - Electrical - Others (add comments)
- ☐ 1B10 - Electrical - Scope Clarification

168

- ☐ 2A1 - O&M - Missing document
- ☐ 2A2 - O&M - Incomplete document
- ☐ 2A3 - O&M - Erros in document
- ☐ 2A4 - O&M - Conflict in document
- ☐ 2A5 - O&M - Others
- ☐ 2A6 - O&M - Scope Clarification
- ☐ 2B1 - QRP - Missing document
- ☐ 2B2 - QRP - Incomplete document
- ☐ 2B3 - QRP - Erros in document
- ☐ 2B4 - QRP - Conflict in document
- ☐ 2B5 - QRP - Others
- ☐ 2B6 - QRP - Scope Clarification
- ☐ 2C1 - Shipping Document - Missing document
- ☐ 2C2 - Shipping Document - Incomplete document
- ☐ 2C3 - Shipping Document - Erros in document
- ☐ 2C4 - Shipping Document - Conflict in document
- ☐ 2C5 - Shipping Document - Others
- ☐ 2C5 - Shipping Document - Scope Clarification
- ☐ 3A1 - No Defect - No defect

166 — RIR Correspondence

| Letter Date | Letter No | Action | Comment |
|---|---|---|---|
| | | | |

170 — Create New Log

| Package No | GE Control No | Description | Resp Comp | RE |
|---|---|---|---|---|
| 62.1211 | LUN2-1035 | FPCU HEAT EXCHANGERS | GE-SJ | Ose, Richard A |
| 62.1211 | LUN2-1011 | RHR HEAT EXCHANGERS (PS-2) - Spare Bolts/Studs | GE-SJ | Ose, Richard A |
| 62 1211 | LUN1-1005 | REGEN HEAT EXCHANGERS - RWCU | GE-SJ | Ose, Richard A |
| 62 1211 | LUN1-1005 | RHR HEAT EXCHANGERS | GE-SJ | Ose, Richard A |
| 62.1211 | LUN1-1005R | REGEN HEAT EXCHANGERS - RWCU - MISSING STUD | GE-SJ | Ose, Richard A |
| 62.1211 | LUN2-1001 | REGEN HEAT EXCHANGERS - RWCU | GE-SJ | Ose, Richard A |
| 62.1211 | LUN2-1001 | RHR HEAT EXCHANGERS (PS-1) w/o RHR spare bolts/studs | GE-SJ | Ose, Richard A |
| 62.1211 | LUN1-1005 | NON-REGEN HEAT EXCHANGERS - RWCU | GE-SJ | Ose, Richard A |
| 62.1211 | LUN1-1052 | FPCU HEAT EXCHANGERS | GE-SJ | Ose, Richard A |
| 62.1211 | LUN1-1084 | AFPC Heat Exchangers | GE-SJ | Ose, Richard A |
| 62.1211 | LUN2-1001 | NON-REGEN HEAT EXCHANGERS-RWCU | GE-SJ | Ose, Richard A |
| 62.1241 | LUN1-5004 | RCIC Drain Tank & Pump | GE-SJ | Pobre, Joseph R |
| 62.1241 | LUN2-5006 | RCIC Drain Tank & Pump | GE-SJ | Pobre, Joseph R |
| 62.1241 | LUN1-5004R | RCIC Drain Tank & Pump Panel | GE-SJ | Pobre, Joseph R |
| 62.2430 | LUN1-1039 | Mech Cont Penetrations (Hot) | GE-SJ | Wong, Kenneth |
| 62.2430 | LUN2-1033 | Mechanical Containment Penetrations (Hot) | GE-SJ | Wong, Kenneth |
| 62.2430 | LUN1-1004 | Mechanical Containment Penetrations (Cold) | GE-SJ | Wong, Kenneth |
| 62.2430 | LUN2-1002 | Mech Cont Penetrations (Cold) | GE-SJ | Wong, Kenneth |
| 62 2473 | LUN2-1058 | Rupture Disks - Del-2 | GE-SJ | Hughes, Robert L |
| 62 2473 | LUN1-1109 | Rupture Disks - Del-2 | GE-SJ | Hughes, Robert L |

Export Condensed Report | Export Full Report

FIG. 8

| | | Report | Author | Date |
|---|---|---|---|---|
| 1 | ☒ | All Open GE RIRs<br>Filter: RIRStatus = OPEN, Resp Comp = GE-SJ | Sablan, Sonny | 5/1/02 |
| 2 | ☒ | All Open B & V RIRs<br>Filter: RIRStatus = OPEN, Resp Comp = B&V | Sablan, Sonny | 5/1/02 |
| 3 | ☒ | POE=NY, EL Defects<br>Filter: POE = New York, NY, USA, RIRDefects = 1B0, 1B1, 1B2, 1B3, 1B4 1B5, 1B6, 1B7, 1B8, 1B9 | Dubberley, Allen E. | 5/3/02 |
| 4 | ☒ | Shipments in 1st quarter - 2002<br>Filter FOB Date From = 1/1/2002, FOB Date To = 4/1/2002 | Sablan, Sonny | 5/6/02 |
| 5 | ☒ | Shipments in 1st quarter - 2002 with Mechanical Defects<br>Filter: FOB Date From = 1/1/2002, FOB Date To = 4/1/2002, RIR Defects = 1A0, 1A1, 1A2, 1A3, 1A4, 1A5, 1A6, 1A7, 1A8, 1A9 | Sablan, Sonny | 5/7/02 |
| 6 | ☒ | Shipments without RIR Logs<br>Filter: RIRStatus = NOLOG | Sablan, Sonny | 5/13/02 |
| 7 | ☒ | Shipments in 1st quarter - 2002 with O&M Defects - GE-SJ<br>Filter FOB Date From = 1/1/2002, FOB Date To = 4/1/2002, Resp Comp = GE-SJ, RIRDefects = 2A1, 2A2, 2A3, 2A4, 2A6 | Sablan, Sonny | 5/18/02 |
| 8 | ☒ | RE: Baker, Dan<br>Filter: Engineer Type = RE, Engineer = Baker, Dan J | Sablan, Sonny | 5/21/02 |
| 9 | ☒ | CM: J. Hamel<br>Filter: Engineer Type = CM, Engineer = Hamel, Jeffery F | Sablan, Sonny | 5/21/02 |

SYSTEM PROVIDING RECEIPT INSPECTION REPORTING

BACKGROUND OF THE INVENTION

The present invention relates generally to a system for providing receipt inspection reporting and tracking.

Large projects, and in particular large construction projects (e.g., nuclear power plant construction project), often require the coordination of many parties, including, for example, different suppliers and contractors. Specifically, for these types of projects, it is necessary to ship to the project site assembled equipment built by a large number of suppliers, which may be located throughout the world. Further, the shipments may occur over an extended period of time (e.g., many years) and may even occur well in advance of the project start date.

When constructing a nuclear power plant, equipment and supplies are shipped from many different suppliers, with all the equipment having to be built and packaged per federal (e.g., NRC) and international codes (e.g., ROC-AEC), as well as complying with strict nuclear, ASME, and military standards. These standards are specified in procedures (i.e., GLPs) that must be followed by all contractors and suppliers and are subject to customer, regulator, and independent audits.

Further, the equipment, instrumentation, and operational systems (referred to as "packages") are often very complex, including for example safety systems for use in the construction of a nuclear power plant. Procedures are established to track, follow, and resolve all issues associated with the quality of each package prior to installation. For example, equipment may arrive at the construction site with some type of damage caused before, during, or after shipment. These problems may include packaging damage, equipment damage, parts damage (e.g., sealant missing or torn), water damage or rust, missing quality document package, missing O&M manuals, or missing parts. This damage may occur at any point in the packaging and shipping process. It is important to determine the cause for each type of damage, provide a means for prompt action, customer notification, documentation, and resolution of defects in the received equipment. Otherwise, delays and added costs may result.

SUMMARY OF THE INVENTION

The present invention provides a Receipt Inspection Reporting (RIR) system having an online process to track events and interactions involved in controlling a project having many parties involved. In particular, a database system is provided for storing damage and other information (e.g., missing parts) for access and analysis. The information is typically in the form of RIR reports. By using an RIR system of the present invention, early resolution of problems may be provided and procedures for other future projects may be established.

In one embodiment of the present invention a method of providing a receipt inspection reporting process includes receiving receipt inspection reporting data via a web-based receipt inspection reporting system, and storing the received receipt inspection reporting data in a database. The receipt inspection reporting data is configured for access using the web-based receipt inspection reporting system. The receipt inspection reporting data may include information relating to one of defects or damages for a shipment of goods.

In another embodiment of the present invention a method of providing a receipt inspection reporting process includes accessing stored receipt inspection reporting data stored in a receipt inspection reporting database and configured for access by a user via a web-based receipt inspection reporting system, and modifying the stored receipt inspection reporting data using the web-based receipt inspection reporting system. The receipt inspection reporting data in the receipt inspection reporting database is updated based upon the modification. The step of modifying may include entering additional and/or new receipt inspection reporting data using a plurality of predetermined data entry fields provided as part of the web-based receipt inspection reporting system.

In yet another embodiment of the present invention a method of providing a receipt inspection reporting process includes accessing stored receipt inspection reporting data stored in a receipt inspection reporting database, and configured for access using a web-based receipt inspection reporting system, searching the stored receipt inspection reporting data based upon user defined search criteria entered using the web-based receipt inspection reporting system, and outputting receipt inspection reporting data satisfying the user defined search criteria. The web-based receipt inspection reporting system may be configured to provide a predetermined list of defect codes for use in searching. Further, the method may include producing a receipt inspection reporting report for outputting and based upon the user defined search criteria.

In still another embodiment of the present invention a system providing receipt inspection reporting tracking includes a database for storing receipt inspection reporting data and an interface for accessing the receipt inspection reporting data. The interface is configured to provide access to the receipt inspection reporting data via a web-based receipt inspection reporting user input. Further, the web-based receipt inspection reporting user input may be configured to provide predetermined search fields for defining a search of the receipt inspection reporting data stored in the database. The interface also may be configured to generate receipt inspection reporting reports based upon a user defined search.

BRIEF DESCRIPTION OF THE DRAWINGS

The present invention will become more fully understood from the detailed description and the accompanying drawings, wherein:

FIG. 4 is a screen shot of the data edit/entry page of FIG. 4 showing RIR details for a specific shipment;

FIG. 5 is a screen shot of a new log page of the present invention;

FIG. 6 is a screen shot of a search/report page of the present invention;

FIG. 7 is a screen shot of a search results page of the present invention; and

FIG. 8 is a screen shot of a custom filter/reports page of the present invention.

DETAILED DESCRIPTION OF THE PREFERRED EMBODIMENTS

The following description of the preferred embodiments is merely exemplary in nature and is in no way intended to limit the invention, its application, or uses. Although the present invention is described in connection with collecting and storing Receipt Inspection Reporting (RIR) and related data using particular component parts and processes, it is not so limited, and different or additional data may be collected and stored using different or additional component parts and processes.

When reference is made herein to a page, it refers to content arranged on a screen of a computer, network terminal or any other device having a display and capable of displaying electronic content. Further, when reference is made herein to RIR data, this refers to any and all data or information relating to an RIR process, and may include, for example: equipment descriptive information; supplier, packer, shipper and surveyor identifications; handling and routing data; conditions and observations at differing stages of supply, transit and storage; defects observed in equipment; conditions observed related to shipping, handling and storage that may influence the creation or mitigation of defects; persons of responsibility for shipments; etc.

The present invention provides in one embodiment a system and method to coordinate the fabrication of shipment packages, their schedule of shipment, receipt by the project site, documentation of the notification, and resolution of all non-conformations (e.g., RIRs) using a network-based system. The system generally includes a network server connected to a database, and has a tracker interface for collecting and maintaining RIR information. The system provides for cross-referencing the RIRs, updating the database, contacting the individual or entity responsible for the package(s) or shipment(s) of interest, and providing information in response to an inquiry (i.e., search).

Figure 1:
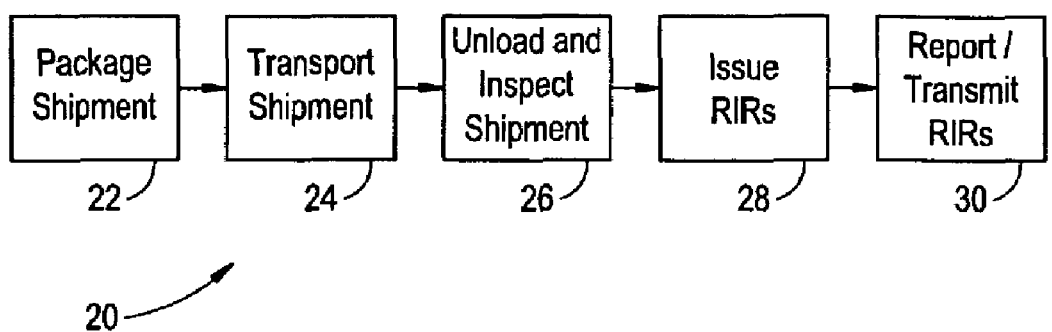
FIG. 1 is a flow chart showing an exemplary shipping and Receipt Inspection Reporting (RIR) process in connection with which the present invention may be implemented.

Before describing a system of the present invention for providing an RIR process, including RIR tracking and analysis, an exemplary shipping and RIR reporting process for a project (e.g., nuclear power plant construction project) in connection with which the present invention may be implemented will be described. Referring to FIG. 1, in an exemplary shipment and RIR reporting process 20, shipments, including, for example, equipment, instrumentation, operation systems, controls, etc. are packaged at 22. It should be noted that over the period of a project, many different vendors and suppliers will provide these packaged shipments. The packaged shipments are then transported at 24 and unloaded and inspected at 26. The inspection may occur at the construction site or at some other location (e.g., receiving dock).

After an inspection is performed, RIRs are issued setting forth specific problems with a shipment, including, for example, damage to the parts shipped and missing parts or documentation. These RIRs are then transmitted and/or reports generated based upon the RIRs at 30 and may include a multi-layer process wherein reports are issued and approved, then forwarded to other departments for review and approval before finally being reported. For example, the process may include not only internal reports, but external reports that are required by government standards or reporting requirements. The reports and RIR information are then used to resolve the problems and/or defects and may include attempts to provide quality improvement in the future (e.g., new packing procedures).

Figure 2:
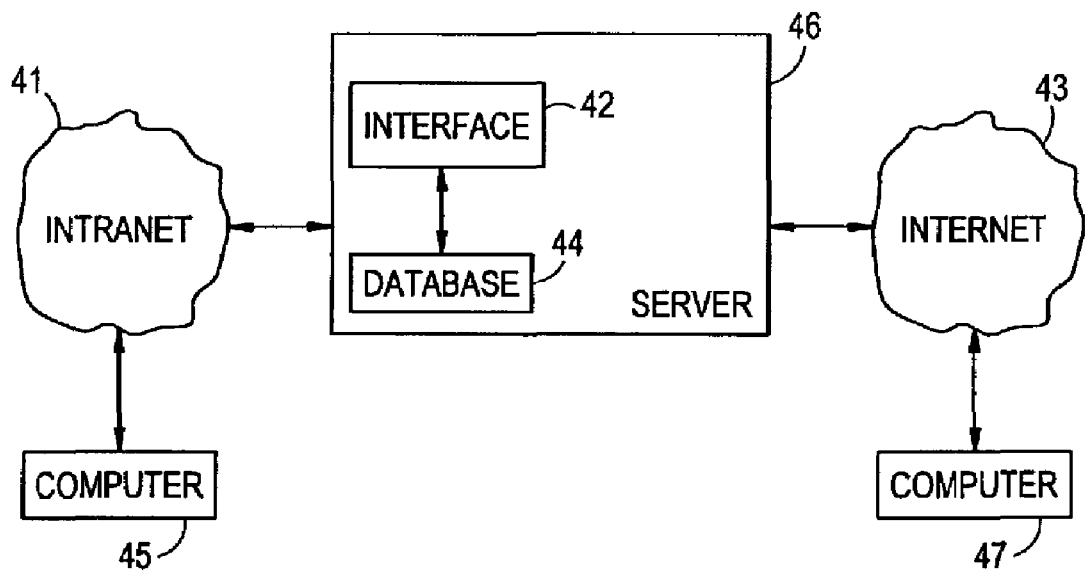
FIG. 2 is a block diagram of a system of the present invention for providing an RIR process for tracking and analysis.

Having described an exemplary shipping and RIR reporting process 20, a system for providing an RIR process, including for use in RIR tracking and analysis, will now be described. Specifically, and as shown in FIG. 2, a system for providing an RIR process, including tracking of RIR information (e.g., RIR reports) is shown generally and indicated by reference numeral 40. The system 40 includes an RIR tracker interface 42 that receives RIR data (e.g., RIR reports) and stores the received RIR data in a database 44. The RIR tracker interface may be provided online, and is connected to a network server 46 or other system allowing for electronic entry of RIR data, electronic searching of stored data and electronic generation of RIR reports providing sorted information relating to the RIR data. The RIR data thereafter may be accessed internally via, for example, an intranet 41 using a computer 45, or externally via, for example, the Internet 43, using a computer 47.

The RIR tracker interface 42 in combination with the database 44 provides for tracking RIR data that is stored and configured (i.e., organized) to allow for future access and analysis. More particularly, the RIR tracker interface 42 provides a filter system that categorizes defects and allows for ease in later access. Further, defect codes may be assigned for different categories of defects to facilitate access, including, for example, searching for specific defect data.

More particularly, RIR data stored within the database 44 is categorized in two main categories including a physical category and a document category. Within each of these defect categories, defect subcategories are provided, including within the physical category, a mechanical subcategory and an electrical subcategory, and within the document category, an operating and maintenance (O&M) subcategory, a Quality Record Package (QRP) subcategory, and a shipment documents subcategory. Based upon the categorized defects, defect codes additionally may be assigned and stored with the RIR data within the database 44 to facilitate access to and analyzing of the data. A predetermined list of descriptions for defect codes may be provided for easier identification and standardization of the defects. For example, defects that commonly occur may be identified with a defect code and accompanying short description of the defect (e.g., corrosion).

Referring now to FIGS. 3 through 8, the RIR tracker interface 42 allows for the entry, modification, searching, reporting and tracking of RIR data. Additionally, analysis of the RIR data may be performed based upon, for example, a report generated from a particular search. In one embodiment, the RIR tracker interface 42 is configured to provide an RIR system main display page, which may be, for example, a main home page accessible via the Internet 43 or via an intranet. The RIR main display page includes selectable members for initiating operation of different operations and processes of the system 40. For example, an entry log selectable member, a search selectable member, a report selectable member, a generate report selectable member, a shipment information selectable member, an administrator selectable member, and an exit selectable member may be provided. As described in more detail herein, the selectable members provide for operation of the RIR tracker interface 42 to provide an RIR process of the present invention.

Figure 3:
FIG. 3 is a screen shot of a data entry/edit page of the present invention.

More specifically, a data entry/edit page 120 as shown in FIG. 3 allows for entry of a new RIR log for a particular shipment or to edit and/or add to an existing log. An entry selectable member 122 is provided to initiate an RIR log entry process. A search/reports selectable member 124 is also provided to switch between entry of RIR data and searching and/or reporting of previously entered RIR data. In order to select either of these members, a user may, for example, click on these headings using a mouse pointer. Further, a control number field 126 is provided to select a particular shipment, for example, by shipment control number.

Upon selecting a particular shipment, entry of shipment information in a shipment details section 130 of the data entry/edit page 120 is provided as shown in FIG. 4. This may include, for example, entry of shipment information such as the description of the shipment, supplier information, location and date of delivery, and personnel involved in this shipment. If the particular shipment is an existing shipment, certain shipment data may not be provided (e.g., shipment data incomplete) and an update option will be provided. In particular, and for example, pull down and select fields 132 may be provided to update incomplete data. As shown, the user may enter shipment type or packer identification information and click on the update selectable member 134 to update the shipment data. It should be noted that the alternate fields for entering incomplete data may be provided, such as, for example, a user input field providing for manual entry of the information.

Further, an RIR log details section 136, an RIR defects section 138 and an RIR correspondence section 140 are also provided. Specifically, the RIR log details section 136 provides information regarding data logged into the particular report for the identified shipment and a user may select an edit log details member 142 to edit the data, including adding more log details. The RIR defects section 138 includes a defect list 146 setting forth the defects for the particular shipment. Specifically, a defect code, a category or subcategory identifier, and a description for the defect are preferably provided. An edit defects selectable member 144 is provided to allow for editing of the RIR defects list 146, including adding additional defects. The RIR correspondence section 140 includes information relating to letters and other correspondence regarding the RIR defects listed in the RIR defects section 138. An add selectable member 148 is provided to add details regarding further RIR correspondence, including a letter date, letter number, particular action and comments regarding the RIR correspondence, such as specific defects, damage or concerns with respect to the shipment.

If the shipment selected in the control number field 126 does not have any RIR log details, a new log screen 160 as shown in FIG. 5 is provided. The new log screen 160 includes an RIR log details section 162, an RIR defects section 164 and an RIR correspondence section 166. In particular, the RIR log details section 162 allows for entry of the date of the RIR, an RIR number (i.e., tracking number) and a surveyor number. The date is automatically entered with the current date for which the information is being entered. The RIR defects section 164 includes a predetermined list 166 of possible defects, which includes a defect number, defect category and defect description. Selection members 168, shown in exemplary form as selectable boxes, are provided to select all defects that apply to the new RIR log. A user selects the appropriate RIR defects, for example, by clicking the selectable boxes 168 that apply to the defects for the RIR being entered. The RIR correspondence section 166 provides for entering information regarding a letter or other report to which the RIR being entered relates, and provides for the entry of a letter date, letter number, action and comment. After the appropriate RIR details have been entered, a new log is created using a create new log selectable member 170. Thereafter, more information may be entered on the entry/edit page 120 as shown in FIG. 4.

Figure 6:
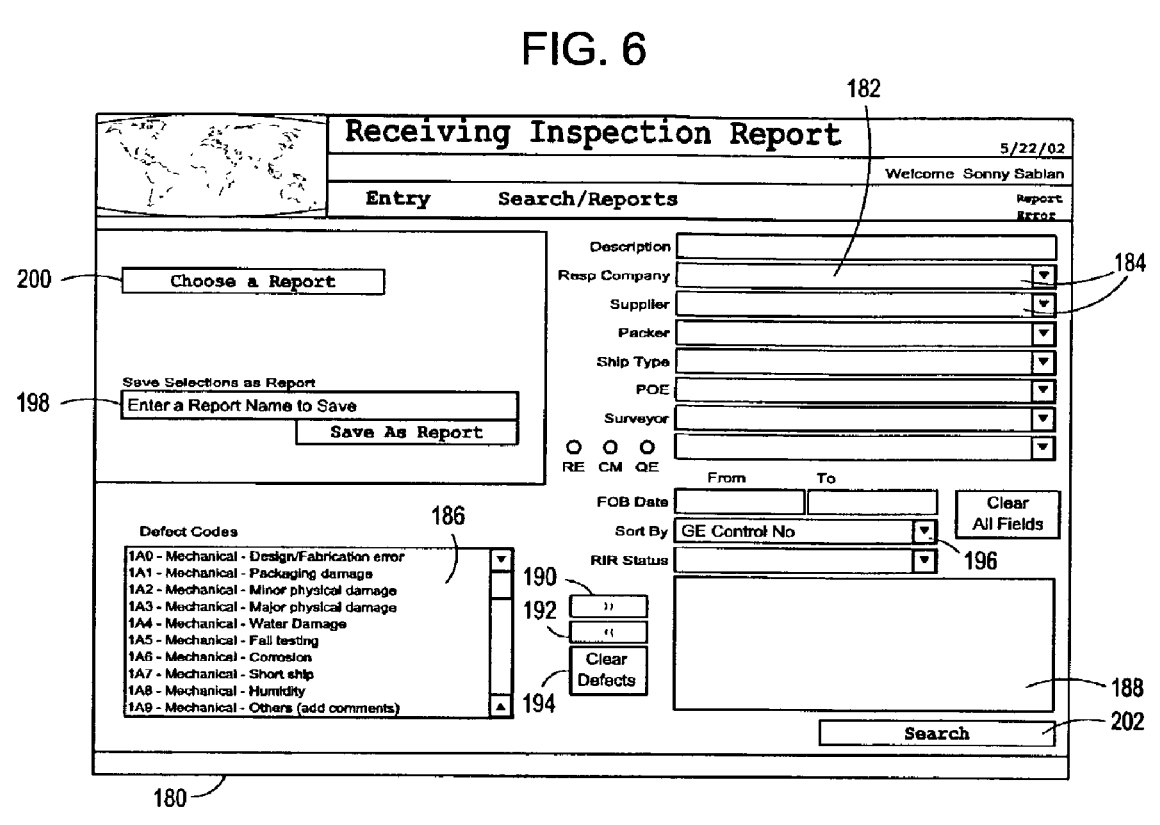

A search/reports page 180 is also provided and allows for performing searches, which include new searches and/or searches using reports generated from previous searches, when the search/reports selectable member 124 shown in FIG. 4 is selected. Specifically, as shown in FIG. 6, the search/reports page 180 includes a search criteria section 182 having a plurality of search fields 184, which may be configured, for example, as pull down menus to define a particular search. These search fields 184 may include fields for entry of an RIR description, company name, supplier name, packer name, shipment type, point of entry (POE) or surveyor. A defect codes search criteria section 186 is also provided and includes a list of defects codes for use in searching. One or more of the defect codes may be selected and provided as part of a search list in a defects search section 188 by clicking on an add selectable member 190. Defect search criteria may be removed by selecting the remove defects selectable member 192 or all defects may be cleared using the clear defects selectable member 194. A sort field 196 is also provided to define the format in which the search results are displayed (e.g., by control number). A report name field 198 is also provided to enter a name to save the search as a report if desired. Thereafter, by selecting a "choose a report" selectable member 200, a list of reports (i.e., previous searches) may be accessed as shown in FIG. 8 and thereafter modified using the search/report page 180. A search selectable member 202 is provided to initiate a search based upon the search criteria entered and selected within the search/report page 180.

Thereafter, and as shown in FIG. 7, a search report screen 220 is provided and includes the results of the search based upon the search criteria entered and selected. Information regarding the RIRs and satisfying the search criteria are provided including, for example, the package number, control number, description, responsible company and a point of contact. Additionally, for each RIR, a link is provided for the control number, which when selected, links to a display to view the shipment and RIR details for the particular package number. Further, an export condensed report selectable member 222 is provided, and when selected, provides a condensed report having minimal data for each RIR. An export full report selectable member 224 is also provided and when selected provides a full report that has all data fields for each RIR. The exported search reports may be provided in different formats, including as a spreadsheet file for saving on a local computer or network. Further, it should be noted that the generated reports may be transmitted (e.g., via email) to specific individuals and/or entities.

A custom filter/reports page 240 as shown in FIG. 8 is also provided to display previous reports generated, including the author of the report and the date of the report, when the "choose a report" selectable member 200 shown in FIG. 6 is selected. As shown in FIG. 8, the custom filter/reports page 240 includes links 242 for each saved report, and may be selected to populate the search/report page 180 with the selected search criteria that is listed for the report selected. Further, a delete button 244 is provided for each of the reports that have been saved for selection to delete the particular custom report.

Using the RIR system 40 of the present invention providing the RIR tracking and reporting process, including using the various RIR input and report pages, the number of RIR defects for a project may be reduced and recommendations for preventative actions to avoid future RIR defects may be provided. For example, specific searches may be performed to determine the root cause(s) of the defects and/or damages. In such an analysis, all the RIRs to date may be evaluated with the defects categorized, for example, by defect code, to study trends for use in analysis. By determining the root causes, implementation of preventative actions may be provided and future shipments studied to further reduce RIR defects. Further, using the present invention, new forms for RIR inspection may be developed to facilitate analysis, and acceptable RIR percentage levels may be determined.

Using the RIR system 40, and in particular when configured for web-based access, baseline costs may be reduced through cost containment, as well as with the elimination of the need for additional personnel to manage the information exchanges. Online RIR submittal, tracking, reporting, and resolution capabilities reduce costs when processing RIRs used for identifying and thereafter repairing equipment damage. Meeting critical to quality objectives (CTQs) by delivering damage free equipment on each shipment is more easily provided. Further, the information gathered and stored may be used for future projects and orders.

Thus, the RIR system 40 of the present invention automates the coordination between the parties involved in a large project (e.g., nuclear power plant construction project), using online (e.g., Internet) tracking and reporting. The system provides a single channel of information that results in efficient coordination of multiple shipments allowing for more effective planning and management based upon real-time online decisions. By coordinating these events, delays are minimized, and responses to requests and/or observed defects are quickly analyzed and reported or resolved. Information is retained and used for lessons learned and to determine root causes for the damages.

The description of the invention is merely exemplary in nature and, thus, variations that do not depart from the gist of the invention are intended to be within the scope of the invention. For example, while the pages shown in FIGS. 3-8 represent pages of an embodiment of the present invention for a nuclear power plant construction project, the present invention is not limited to the specific form of these pages when applied to a nuclear power plant construction project and the application of the present invention is not limited to nuclear power plant construction projects. Such variations are not to be regarded as a departure from the spirit and scope of the invention.

The invention claimed is:

1. A method of providing a receipt inspection reporting process, comprising:
   receiving receipt inspection reporting data via a web-based receipt inspection reporting system; and
   storing the received receipt inspection reporting data in a database, the receipt inspection reporting data configured for access using the web-based receipt inspection reporting system,
   wherein the stored receipt inspection reporting data includes defect codes for assigning different categories, the different categories being a physical category and a document category, the categorized defect codes are assigned and stored in the receipt inspection reporting data within the database to facilitate and evaluate the data, and
   the receipt inspection reporting data is processed via multi-layers for review and approval before being reported.

2. The method according to claim 1 further comprising updating automatically the stored receipt inspection reporting data upon receiving updated receipt inspection reporting data.

3. The method according to claim 1 wherein the receipt inspection reporting data comprises information relating to one or more of defects or damages for a shipment of goods.

4. The method according to claim 1 further comprising the step of inputting receipt inspection reporting data for storing in the database.

5. A method of providing a receipt inspection reporting process, comprising:
   accessing stored receipt inspection reporting data stored in a receipt inspection reporting database and configured for access by a user via a web-based receipt inspection reporting system; and
   modifying the stored receipt inspection reporting data using the web-based receipt inspection reporting system, with the receipt inspection reporting data in the receipt inspection reporting database updated based upon the modification,
   wherein the stored receipt inspection reporting data includes defect codes for assigning different categories, the different categories being a physical category and a document category, the categorized defect codes are assigned and stored in the receipt inspection reporting data within the database to facilitate and evaluate the data, and
   the receipt inspection reporting data is processed via multi-layers for review and approval before being reported.

6. The method according to claim 5 wherein the step of modifying comprises entering additional receipt inspection reporting data using a plurality of predetermined data entry fields provided as part of the web-based receipt inspection reporting system.

7. The method according to claim 5 wherein the step of modifying comprises entering new receipt inspection reporting data using a plurality of predetermined data entry fields provided as part of the web-based receipt inspection reporting system.

8. The method according to claim 5 wherein the receipt inspection reporting data comprises at least one of receipt inspection reporting shipment information, receipt inspection reporting log information, receipt inspection reporting defect information, receipt inspection reporting damage information and receipt inspection reporting correspondence information.

9. A method of providing a receipt inspection reporting process, comprising:
   accessing stored receipt inspection reporting data stored in a receipt inspection reporting database, and configured for access using a web-based receipt inspection reporting system; and
   searching the stored receipt inspection reporting data based upon user defined search criteria entered using the web-based receipt inspection reporting system, outputting receipt inspection reporting data satisfying the user defined search criteria,
   wherein the stored receipt inspection reporting data includes defect codes for assigning different categories, the different categories being a physical category and a document category, the categorized defect codes are assigned and stored in the receipt inspection reporting data within the database to facilitate and evaluate the data, and
   the receipt inspection reporting data is processed via multi-layers for review and approval before being reported.

10. The method according to claim 9 wherein the web-based receipt inspection reporting system is configured to provide a predetermined list of defect codes for use in searching.

11. The method according to claim 9 further comprising using search criteria from a previous search report to define search parameters for searching the stored receipt inspection reporting data.

12. The method according to claim 9 further comprising producing a receipt inspection reporting report for outputting and based upon the user defined search criteria.

13. The method according to claim 12 wherein the step of producing comprises generating automatically a receipt inspection reporting report based upon the user defined search criteria for outputting and further comprising electronically transmitting the report.

14. The method according to claim 9 wherein the searching is performed based upon at least one of a predetermined set of search criteria.

15. The method according to claim 9 wherein the receipt inspection reporting data comprises at least one of receipt inspection reporting shipment information, receipt inspection reporting log information, receipt inspection reporting defect information, receipt inspection reporting damage information and receipt inspection reporting correspondence information.

16. The method according to claim 9 wherein the stored receipt inspection reporting data is sorted based upon predetermined categories.

17. A system providing receipt inspection reporting tracking, comprising:

a database for storing receipt inspection reporting data; and an interface for accessing the receipt inspection reporting data and configured to provide access to the receipt inspection reporting data via a web-based receipt inspection reporting user input, wherein the stored receipt inspection reporting data includes defect codes for assigning different categories, the different categories being a physical category and a document category, the categorized defect codes are assigned and stored in the receipt inspection reporting data within the database to facilitate and evaluate the data, and the receipt inspection reporting data is processed via multilayers for review and approval before being reported.

18. The system according to claim 17 wherein the web-based receipt inspection reporting user input is configured to provide predetermined search fields for defining a search of the receipt inspection reporting data stored in the database.

19. The system according to claim 18 wherein the interface is configured to generate receipt inspection reporting reports based upon a user defined search.

20. The system according to claim 17 wherein the interface is configured to automatically update the receipt inspection reporting data within the database based upon a user modification.

* * * * *